US012068125B2

(12) United States Patent
Song et al.

(10) Patent No.: US 12,068,125 B2

(45) Date of Patent: Aug. 20, 2024

(54) SEMICONDUCTOR CIRCUIT BREAKER

(71) Applicant: LS ELECTRIC CO., LTD., Anyang-si (KR)

(72) Inventors: Woonghyeob Song, Anyang-si (KR); Jungwook Sim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 94 days.

(21) Appl. No.: 17/923,159

(22) PCT Filed: Mar. 29, 2021

(86) PCT No.: PCT/KR2021/003831

§ 371 (c)(1),
(2) Date: Nov. 3, 2022

(87) PCT Pub. No.: WO2021/225281

PCT Pub. Date: Nov. 11, 2021

(65) Prior Publication Data

US 2023/0223211 A1 Jul. 13, 2023

(30) Foreign Application Priority Data

May 4, 2020 (KR) ........................ 10-2020-0053379

(51) Int. Cl.

*H01H 9/20* (2006.01)
*H01H 9/02* (2006.01)

(Continued)

(52) U.S. Cl.

CPC ............ *H01H 9/20* (2013.01); *H01H 9/0264* (2013.01); *H01H 9/541* (2013.01); *H01H 71/0214* (2013.01); *H01H 71/10* (2013.01)

(58) Field of Classification Search

CPC ........ H01H 9/20; H01H 9/0264; H01H 9/541; H01H 71/0214; H01H 71/10; H01H 71/08;

(Continued)

(56) References Cited

U.S. PATENT DOCUMENTS 4,870,531 A 9/1989 Danek
10,600,587 B2 * 3/2020 Patwardhan ........... H01H 71/56

(Continued)

FOREIGN PATENT DOCUMENTS

EP 3065153 A1 9/2016
JP S58106819 U 7/1983

(Continued)

OTHER PUBLICATIONS

International Search Report for related International Application No. PCT/KR2021/003831; action dated Nov. 11, 2021; (5 pages).

(Continued)

*Primary Examiner* — Ahmed M Saeed

(74) *Attorney, Agent, or Firm* — K&L Gates LLP

(57) ABSTRACT

The present disclosure relates to a semiconductor circuit breaker, and more specifically, to a semiconductor circuit breaker provided with a detachable interface module. The semiconductor circuit breaker, according to one embodiment of the present disclosure, comprises: a circuit breaker main body connected to a main circuit and provided with a module receiving unit on the outer surface thereof; and an interface module provided independently from the circuit breaker main body and detachably coupled to the module receiving unit. The circuit breaker main body comprises: a terminal cover rotatably coupled to a terminal unit of the circuit breaker main body; and an interlock member provided to the circuit breaker main body and restricting or releasing the opening of the terminal cover. The interface (Continued)

module comprises an interlock driving unit for operating the interlock member.

14 Claims, 8 Drawing Sheets

(51) Int. Cl.
*H01H 9/54* (2006.01)
*H01H 71/02* (2006.01)
*H01H 71/10* (2006.01)

(58) Field of Classification Search
CPC ......... H01H 2071/006; H01H 71/0228; H01H 71/0207
See application file for complete search history.

(56) References Cited

U.S. PATENT DOCUMENTS

| | | | | |
|---|---|---|---|---|
| 2015/0129550 | A1* | 5/2015 | Pochopien ............. | H01H 9/342<br>218/149 |
| 2016/0260560 | A1* | 9/2016 | Mishra ................... | H01H 71/52 |
| 2020/0185177 | A1* | 6/2020 | Kim ..................... | H01H 71/082 |
| 2021/0202201 | A1* | 7/2021 | Lagree ................... | H01H 71/04 |
| 2022/0285105 | A1* | 9/2022 | Zhang .................... | H01H 71/08 |

FOREIGN PATENT DOCUMENTS

| | | | |
|---|---|---|---|
| JP | H0512978 | A | 1/1993 |
| KR | 200392657 | Y1 | 5/2005 |
| KR | 101003962 | B1 | 12/2010 |
| KR | 20150118338 | A | 10/2015 |
| KR | 20170087742 | A | 7/2017 |
| KR | 20180099329 | A | 9/2018 |

OTHER PUBLICATIONS

Written Opinion for related International Application No. PCT/KR2021/003831; action dated Nov. 11, 2021; (4 pages).

Office Action for related Korean Application No. 2020-0053379; action issued Jan. 9, 2023; (3 pages).

Extended European Search Report for related European Application No. 21799834.3; action dated Apr. 19, 2024; (6 pages).

* cited by examiner

SEMICONDUCTOR CIRCUIT BREAKER

CROSS-REFERENCE TO RELATED APPLICATIONS

The present application is a National Stage of International Application No. PCT/KR2021/003831 filed on Mar. 29, 2021, which claims priority to and the benefit of Korean Utility Model Application No. 10-2020-0053379, filed on May 4, 2020, the disclosure of which is incorporated herein by reference in its entirety.

FIELD

The present disclosure relates to a semiconductor circuit breaker, and more particularly, to a semiconductor circuit breaker having a detachable interface module.

BACKGROUND

In general, a semiconductor circuit breaker is a circuit breaker designed to break a circuit using a power semiconductor device such as a MOSFET, an IGBT, or the like. Since the semiconductor circuit breaker performs circuit breaking using the current breaking characteristic of the power semiconductor device, an arc is not generated during circuit breaking, so an arc removal function is not required. Therefore, there is an advantage in that an arc extinguishing part is removed to reduce its volume. Furthermore, there is an advantage in that an arc breaking time is short. On the contrary, a low-capacity circuit breaker has a disadvantage in that manufacturing cost increases due to the use of a power semiconductor device.

The semiconductor circuit breaker is often used in a system that requires quick breaking. In the case of a general mechanical circuit breaker, a breaking speed thereof is several to several hundred ms, whereas a breaking speed of the semiconductor circuit breaker is several tens of μs, thereby breaking a current in a much shorter time.

Accordingly, the semiconductor circuit breaker is being actively used in a switchboard with a large current capacity, a direct current system with a rapid increase in fault current, or an energy storage system (ESS) that requires stable current supply and breaking. In recent years, considering an accident in which an ignition occurs in the ESS system, the importance of a circuit breaker for stable current supply considering heat generation is becoming more urgent.

Such a circuit breaker is provided with a terminal cover in order to improve the insulation performance of a terminal part.

FIG. 1 illustrates a perspective view of a molded case circuit breaker provided with a terminal cover according to the related art.

A molded case circuit breaker 1 according to the related art is provided with terminal parts 2 connected to a power source or a load on both sides thereof, and a terminal cover 3 is provided on each terminal part 2.

The terminal cover 3 installed on the terminal part 2 may be used for dust prevention, bus bar drawn-out, and terminal drawn-out depending on the purpose. Here, the purpose of dust prevention is to close the terminal part 2 as much as possible to prevent dust from entering thereinside and to maximize insulation between phases, the purpose of the bus bar drawn-out is to open a lower portion of the terminal part 2 to connect a bus bar (not shown) to the terminal part 2, and the purpose of terminal drawn-out is to open the terminal part 2 up to a middle portion thereof to connect the terminal part 2 to a terminal (not shown).

The terminal cover 3 is provided with a drawn-out part disposed with a groove, and a cover member 4 for drawing out a bus bar or a terminal is disposed to be removable in the drawn-out part. A user may remove the cover member 4 from the drawn-out part by separating or breaking a connection part between the drawn-out part and the cover member 4 using a force.

However, an interlock is not applied to the terminal cover of the molded case circuit breaker according to the related art as described above. Therefore, since an arbitrary access is allowed, there is a risk of a change of the terminal part or a breakdown of insulation.

In addition, although not shown separately, in a molded case circuit breaker provided with an interface module, an authority to open the terminal cover may be required only when the interface module is coupled to a circuit breaker body.

SUMMARY

The present disclosure is made to solve the foregoing problems, and an aspect of the present disclosure is to provide a semiconductor circuit breaker having an interlock function for a terminal cover.

Another aspect of the present disclosure is to provide a semiconductor circuit breaker having an interface module that is separated from a circuit breaker body to operate the circuit breaker body from an outside thereof, the semiconductor circuit breaker allowing the terminal cover to be open only when the interface module is coupled to the circuit breaker body.

A semiconductor circuit breaker according to an embodiment of the present disclosure may include a circuit breaker body connected to a main circuit, and provided with a module receiving part on an outer surface thereof; and an interface module provided independently from the circuit breaker body, and detachably coupled to the module receiving part, wherein the circuit breaker body includes a terminal cover coupled to a terminal part of the circuit breaker body; and an interlock member provided in the circuit breaker body to restrict or release the opening of the terminal cover, and the interface module includes an interlock driver that operates the interlock member.

Here, the terminal cover may be provided with a rotary part so as to be rotatably coupled to the terminal part.

Furthermore, a locking lever restricted to the interlock member may be disposed to protrude from the rotary part of the terminal cover.

Furthermore, a first return spring may be provided in the rotary part of the terminal cover to apply a force in a direction in which the terminal cover is closed.

Furthermore, the interlock member may be rotatably coupled to an inside of the circuit breaker body, wherein a second return spring is provided in the interlock member to apply a force to the interlock member in a direction of restricting the locking lever.

Furthermore, an engaging portion that restricts the locking lever may be disposed to protrude from one end of the interlock member.

Furthermore, the interlock driver may include a magnet.

Furthermore, the interlock member may include an interlock release portion configured with a magnetic body to be attracted to the interlock driver.

Furthermore, a guide hole may be defined in a vertical slit shape in the interlock member, and a guide part inserted into the guide hole may be disposed to protrude from the circuit breaker body so as to guide a vertical movement of the interlock member.

Furthermore, an interlock driver that presses the interlock member downward may be disposed to protrude from the interface module.

Furthermore, an insertion hole into which the interlock driver is inserted may be disposed in the module receiving part.

Furthermore, the interlock member may be configured with a length reaching the two terminal covers provided in both terminal parts of the circuit breaker body, respectively.

Furthermore, the engaging portions may be disposed at both end portions of the interlock member, respectively.

In addition, the guide holes may be respectively disposed in support portions protruding from both end portions of the interlock member, respectively.

According to a semiconductor circuit breaker according to an embodiment of the present disclosure, an interlock is applied to a terminal cover provided in a terminal part of a circuit breaker body, thereby preventing an arbitrary access to the terminal part.

Accordingly, an arbitrary change of the terminal part is restricted, and a risk of insulation breakdown of the terminal part is reduced.

The opening of the terminal cover is allowed only when an interface module is coupled to the circuit breaker body.

Accordingly, the control of the circuit breaker body by the interface module is strengthened.

BRIEF DESCRIPTION OF THE DRAWINGS

FIGS. 4 and 5 are side views showing an operating state of the semiconductor circuit breaker according to the first embodiment of the present disclosure, in which FIG. 4 is an interface module separation state, and FIG. 5 is an interface module coupling state.

FIGS. 6 and 7 are side views showing a semiconductor circuit breaker according to a second embodiment of the present disclosure, in which FIG. 6 is an interface module separation state, and FIG. 7 shows an interface module coupling state.

DETAILED DESCRIPTION

Hereinafter, preferred embodiments of the present disclosure will be described with reference to the accompanying drawings, which are intended to describe the present disclosure in detail to allow a person skilled in the art to easily carry out the disclosure, but not to mean that the technical concept and scope of the present disclosure are limited thereto.

A semiconductor circuit breaker according to each embodiment of the present disclosure will be described in detail with reference to the drawings.

First Embodiment

Figure 1:
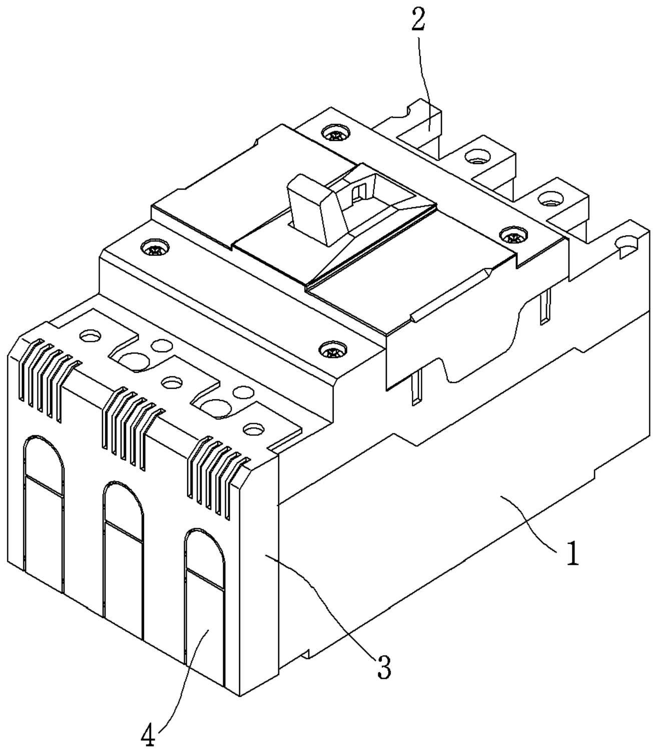
FIG. 1 is a perspective view of a molded case circuit breaker provided with a terminal cover according to the related art.
Figure 2:
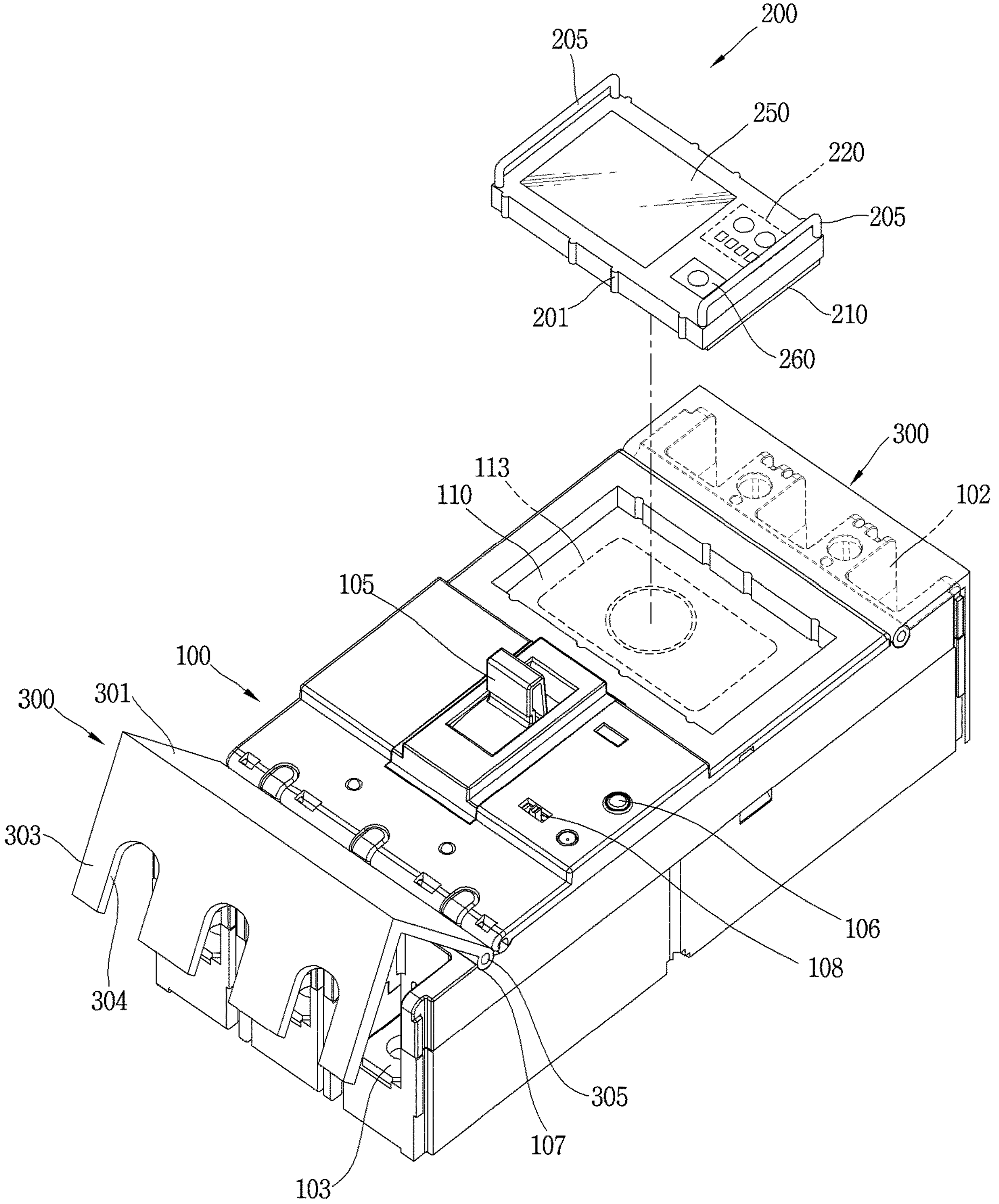
FIG. 2 is an exploded perspective view of a circuit breaker body and an interface module of a semiconductor circuit breaker according to a first embodiment of the present disclosure.
Figure 3:
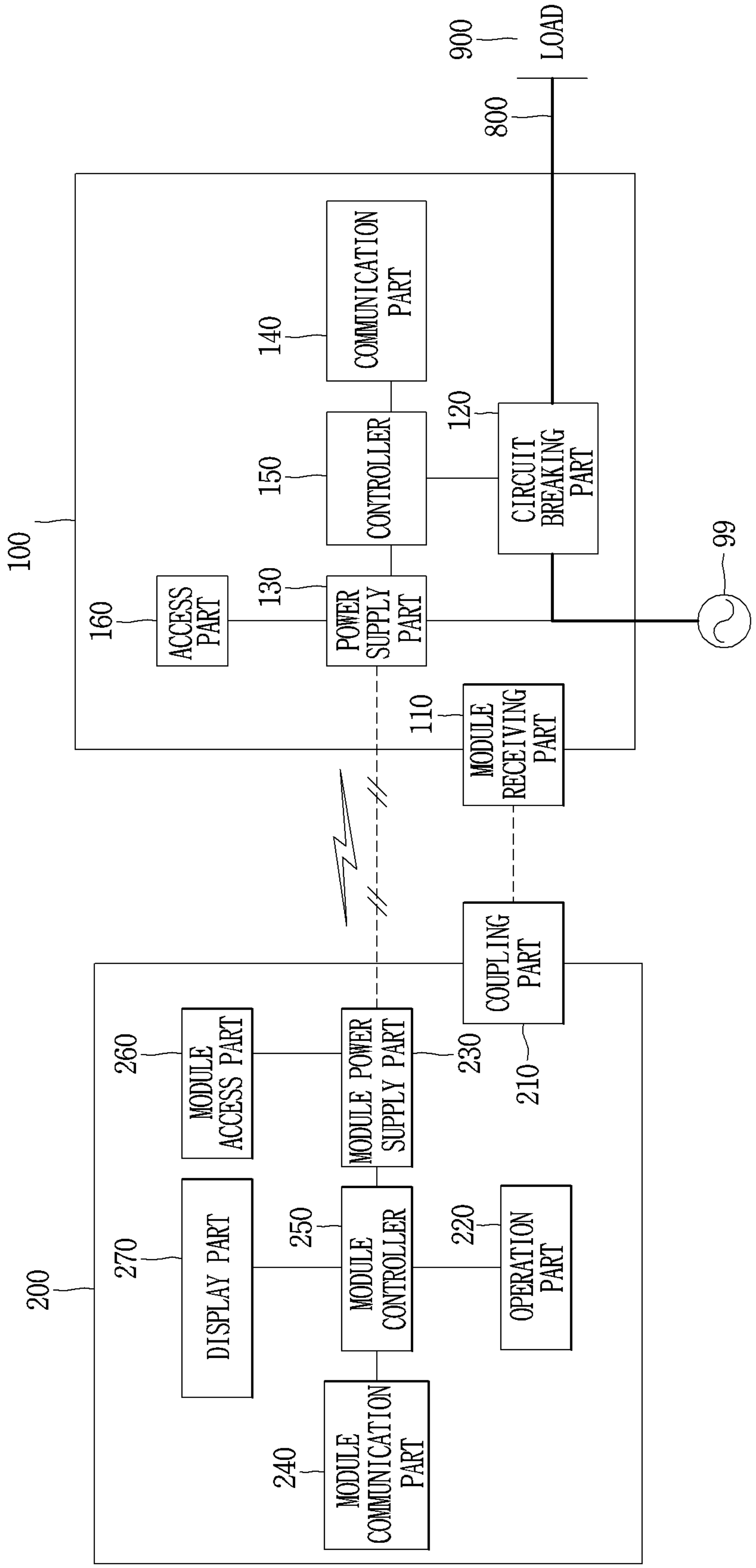
FIG. 3 is a block diagram showing a connection relationship of a circuit breaker body, an interface module, a power source and a load, and a basic configuration of each apparatus in the semiconductor circuit breaker according to the first embodiment of the present disclosure.

FIG. 2 illustrates an exploded perspective view of a circuit breaker body and an interface module of a semiconductor circuit breaker according to a first embodiment of the present disclosure, and FIG. 3 illustrates a connection relationship of a circuit breaker body, an interface module, a power source and a load, and a basic configuration of each apparatus in the semiconductor circuit breaker according to the first embodiment of the present disclosure.

A semiconductor circuit breaker according to a first embodiment of the present disclosure includes a circuit breaker body 100 connected to a main circuit; and an interface module 200 independent from the circuit breaker body 100.

The circuit breaker body 100 has a module receiving part 110 provided on the outer surface of the breaker body 100, and the interface module 200 is detachably coupled to the module receiving part 110.

The circuit breaker body 100 includes a terminal cover 300 rotatably coupled to terminal parts 102, 103; a locking lever 310 provided in the terminal cover 300; and an interlock member 170 provided in the circuit breaker body 100 to restrict or release the locking lever 310.

The interface module 200 includes an interlock driver 280 that operates the interlock member 170.

The semiconductor circuit breaker of the present embodiment is divided into (separated into) a circuit breaker body 100 and an interface module 200.

The circuit breaker body 100 is connected to the main circuit 400 and a load 300. The circuit breaker body 100 is open when an overcurrent occurs between the main circuit 400 and the load 300 or a fault current such as a ground fault occurs to break the main circuit 400 to protect the load 300 and apparatuses and facilities associated therewith.

The circuit breaker body 100 may be independently provided and connected between the main circuit 400 and the load 300. Furthermore, the circuit breaker body 100 is integrally installed in the external apparatus 10 to be used as an accessory apparatus.

The interface module 200 is detachably coupled to the circuit breaker body 100. That is, the interface module 200 may be independently configured, and may be coupled to or separated from the circuit breaker body 100. Here, the circuit breaker body 100 may perform a breaking function (operation) by itself, and may additionally perform a breaking function by the interface module 200. That is, the operation part is provided in the circuit breaker body 100, and the operation part is also provided in the interface module 200. Meanwhile, the interface module 200 may perform an additional function other than the breaking function of the circuit breaker body 100.

The circuit breaker body 100 is provided with the module receiving part 110. The module receiving part 110 is provided on an outer surface of the circuit breaker body 100. The module receiving part 110 may be configured with a groove having a predetermined depth as shown in FIG. 2. However, the present disclosure is not limited thereto, and the module receiving part 110 may be configured with a flat plate or a protrusion portion. That is, although not illustrated separately, a receiving part configured with a protrusion portion may be provided in the circuit breaker body 100, and a groove portion fitted to the receiving portion may be disposed in the interface module 200.

The circuit breaker body 100 is provided with terminal parts 12, 13 configured with a power-side terminal part 103 connected to an external power source 99 and a load-side terminal part 102 connected to the load 300. A terminal is provided in each of the terminal parts 102, 103. That is, the load-side terminal part 102 is provided to expose a load-side terminal, and the power-side terminal part 103 is provided to expose a power-side terminal.

The circuit breaker body 100 is provided with a handle 105 for manually performing a breaking operation by a user's operation. A user may manually operate the circuit breaker body 100.

A reset button 106 for re-insertion after the circuit breaker trips due to a fault current is provided on one side of the handle 105. The reset button 106 provides a reset operation for re-insertion after a trip operation.

The circuit breaker body 100 is provided with a trip display part 108 for displaying a trip state.

The circuit breaker body 100 may be provided with a configuration for performing a breaking operation and a re-insertion operation as described above at an outside thereof, and may be installed and used independently. That is, even when the interface module 200 is not connected thereto, a function may be independently performed. Such a function may be selectively provided. When the circuit breaker body 100 is applied only as a passive terminal operator, such a mechanical operation configuration may be eliminated, and configured to allow only an operation by the interface module 200. In this case, the manufacturing cost of the circuit breaker body 100 is reduced.

The interface module 200 may be defined in the form of a plate or box having a predetermined thickness.

The interface module 200 is provided with a handle 205. The handle 205 is provided to allow a user to easily attach and detach the interface module 200 to and from the circuit breaker body 100. Furthermore, the rotation direction of the interface module 200 may be adjusted using the handle 205.

A coupling part 210 is provided on a rear surface of the interface module 200. The coupling part 210 is detachably coupled to the circuit breaker body 100 to provide a coupling force so as not to be naturally separated therefrom during coupling. Since the interface module 200 is provided with a force of the coupling part 210, it does not fall freely even when the circuit breaker body 100 is coupled in a standing state, and is not separated from the circuit breaker body 100 under a predetermined force.

For an example of a coupling method between the interface module 200 and the circuit breaker body 100, a fitting coupling method may be applied. The interface module 200 is provided with a coupling part 210 and fitted and coupled to the module receiving part 110 of the circuit breaker body 100, and is not naturally released even when the circuit breaker body 100 is disposed in a standing state. Although it is shown and described a case in which the module receiving part 110 is configured with a groove and the coupling part 210 is configured with a protrusion, and vice versa is also possible as described above.

For another example of a coupling method between the interface module 200 and the circuit breaker body 100, a coupling method by a magnetic force may be applicable. A magnet (not shown) may be provided in the coupling part 210 of the interface module 200. Meanwhile, a magnetic body 113 is provided in the module receiving part 110 of the circuit breaker body 100. That is, the module receiving part 110 is provided with a magnetic body 113 made of a material coupled by a magnetic force of the coupling part 210. For example, the magnetic body 113 may be made of a metal material.

In addition, the module receiving part 110 and the coupling part 210 may be configured in an opposite manner. That is, the module receiving part 110 is provided with a magnet, and the coupling part 210 is provided with a magnetic body.

Meanwhile, both the coupling part 210 and the magnetic body 113 may be configured to include a magnet.

The interface module 200 is provided with the interlock driver 280. The interlock driver 280 may be provided on one side of the coupling part 210. Alternatively, the interlock driver 280 may be included in the coupling part 210. That is, the coupling part 210 may serve as the interlock driver 280.

FIG. 3 is a block diagram illustrating a connection relationship of the circuit breaker body 100, the interface module 200, the power source 99, and the load 300, and a basic configuration of respective apparatuses.

First, the circuit breaker body 100 will be described.

A power supply part 130 is provided in the circuit breaker body 100. The power supply part 130 supplies power to each component in the circuit breaker body 100 such as the circuit breaking part 120.

The power supply part 130 may be connected to the external power source 99 or may receive independent power by itself. The power supply part 130 may include an AC/DC converter or a DC/DC converter.

The circuit breaker body 100 is provided with a circuit breaking part 120.

The circuit breaking part 120 is a main contact part that breaks or connects an electrical connection of the main circuit 400. The circuit breaking part 120 is provided with a power semiconductor device (not shown) as a core device of the semiconductor circuit breaker. As such a power semiconductor device, a metal oxide semiconductor field-effect transistor (MOSFET) or an insulated gate bipolar transistor (IGBT) may be applied.

The circuit breaking part 120 may include a protection circuit (not shown) connected in parallel to the power semiconductor device to protect the power semiconductor device from a sudden voltage generated during switching. As an example of such a protection circuit, a snubber circuit or a metal oxide varistor (MOV) may be applied. For the detailed configuration or operation of the circuit breaking part and the protection circuit, reference may be made to the applicant's application "bidirectional semiconductor circuit breaker (10-2019-0042659)" and the like.

The power supply part 130 is connected to the external power source 99 to supply power to the circuit breaker body 100. Furthermore, the power supply part 130 may supply power to the interface module 200. The interface module 200 is provided with a module power supply part 230.

The power supply part 130 may be connected to the module power supply part 230 of the interface module 200 in a wired or wireless manner to supply power.

The power supply part 130 of the circuit breaker body 100 and the module power supply part 230 of the interface module 200 are provided with coils through which mutually induced currents flow.

Accordingly, when the interface module 200 is coupled to the circuit breaker body 100, power may be supplied to an inside of the interface module 200 by a wireless charging method without any separate line connection.

A battery may be provided in the module power supply part 230 of the interface module 200. Accordingly, electricity by the induced current may be stored in the battery.

Furthermore, a battery in which energy is stored may be provided by wired charging instead of using the foregoing wireless charging method.

Figure 4:
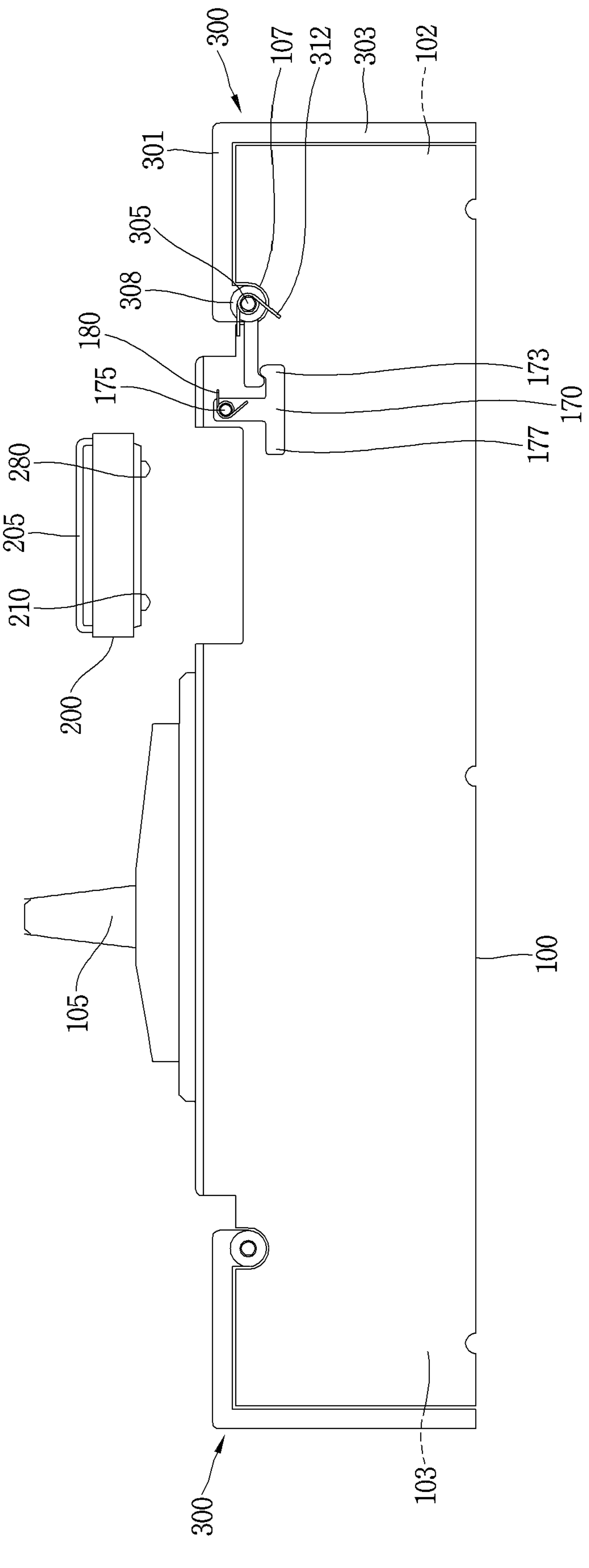

FIG. 4 illustrates a side view of the semiconductor circuit breaker of the first embodiment.

The semiconductor circuit breaker according to the first embodiment of the present disclosure, as a terminal cover interlock configuration, includes the terminal cover 300 rotatably coupled to the terminal parts 102, 103 of the circuit breaker body 100; the locking lever 310 provided in the terminal cover 300; the interlock member 170 provided in the circuit breaker body 100 to restrict or release the locking lever 310; and the interlock driver 280 provided in the interface module 200 to operate the interlock member 170.

The terminal cover 300 is provided in the terminal parts 102, 103 of the circuit breaker body 100, respectively. The terminal cover 300 may be rotatably coupled to the terminal parts 102, 103. That is, the terminal cover 300 is coupled to the circuit breaker body 100 by a cover shaft 305.

The terminal cover 300 maintains a closed state of the terminal parts 102, 103 as long as no external force is applied. Accordingly, an arbitrary access to the terminal parts 102, 103 is prevented.

The terminal cover 300 is formed of an insulating material. Accordingly, the terminal cover 300 prevents the insulation breakdown of the terminal parts 102, 103 from occurring due to an external electric shock or a ground fault in the closed state.

The terminal cover 300 may be defined in an "L" shape when viewed from the side. That is, the terminal cover 300 includes an upper surface portion 301 and a front surface portion 303. Here, the upper surface portion 301 is closed, and a terminal connection groove 304 for each phase may be disposed in the front surface portion 303 for each phase.

A rotary part 308 is provided behind the upper surface portion 301 of the terminal cover 300. The rotary part 308 is disposed to protrude in an arc shape behind the upper surface portion 301. The rotary part 308 is inserted and installed in the shaft groove part 107 of the circuit breaker body 100.

The rotary shaft 305 is inserted and installed in the rotary part 308. The rotary shaft 305 is inserted and installed in a shaft groove or shaft hole (not shown) of the circuit breaker body 100 to allow the terminal cover 300 to rotate.

A first return spring 312 may be provided on the rotary shaft 305. In this embodiment, a force is applied to the first return spring 312 in a direction in which the terminal cover 300 is closed. Accordingly, when no external force is applied, the terminal cover 300 is placed in a closed state. Even when the terminal cover 300 is opened by the user, the terminal cover 300 is closed by a restoring force of the first return spring 312 when the external force is removed. The first return spring 312 may be configured with a torsion spring or a coil spring.

A locking lever 310 is provided on the upper surface portion 301 of the terminal cover 300 or the rotary part 308. The locking lever 310 may be disposed to partially protrude from the upper surface portion 301 or the rotary part 308. A first engaging protrusion may be disposed at an end portion of the locking lever 310.

An interlock member 170 is provided. The interlock member 170 may be installed at an inside of the circuit breaker body 100. The interlock member 170 may be defined in a "T" shape. The interlock member 170 is rotatably installed by a shaft part 175.

An engaging portion 173 is provided at one end of the interlock member 170. The rotation of the locking lever 310 is limited, and the opening of the terminal cover 300 is restricted by the engaging portion 173.

A second engaging protrusion may be disposed adjacent to the first engaging protrusion of the locking lever 310 in the engaging portion 170.

An interlock release portion 177 is provided at the other end of the interlock member 170. The interlock release portion 177 may be configured with a magnetic body. Alternatively, the interlock release portion 177 may include a magnet.

A second return spring 180 may be provided on the interlock member 170. The second return spring 180 returns in a direction of restricting the locking lever 310 when no external force is applied.

Figure 5:
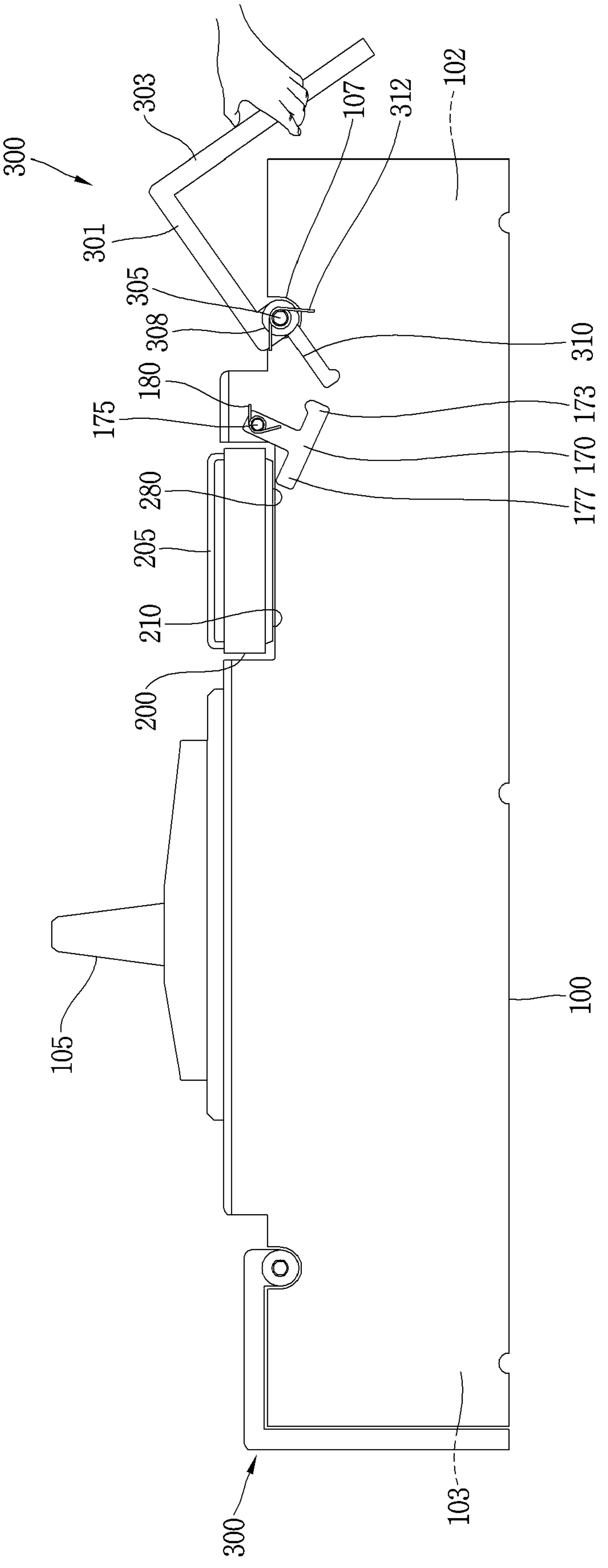

FIG. 5 shows a state in which the interface module 200 is coupled.

When the interface module 200 is coupled, the interlock driver 280 pulls the interlock member 170 by a magnetic force. The interlock member 170 rotates clockwise to be in contact with the interlock driver 280, and release restriction to the locking lever 310. Accordingly, it becomes a state in which the terminal cover 300 can be opened by the user.

In summary, when the interface module 200 is coupled, the interlock driver 280 rotationally moves the interlock member 170, and restriction to the terminal cover 300 is released to become a state in which the terminal cover 300 can be opened. The user may open the terminal cover 300 and perform an operation for the terminal parts 102, 103 as needed.

Second Embodiment

Figure 6:
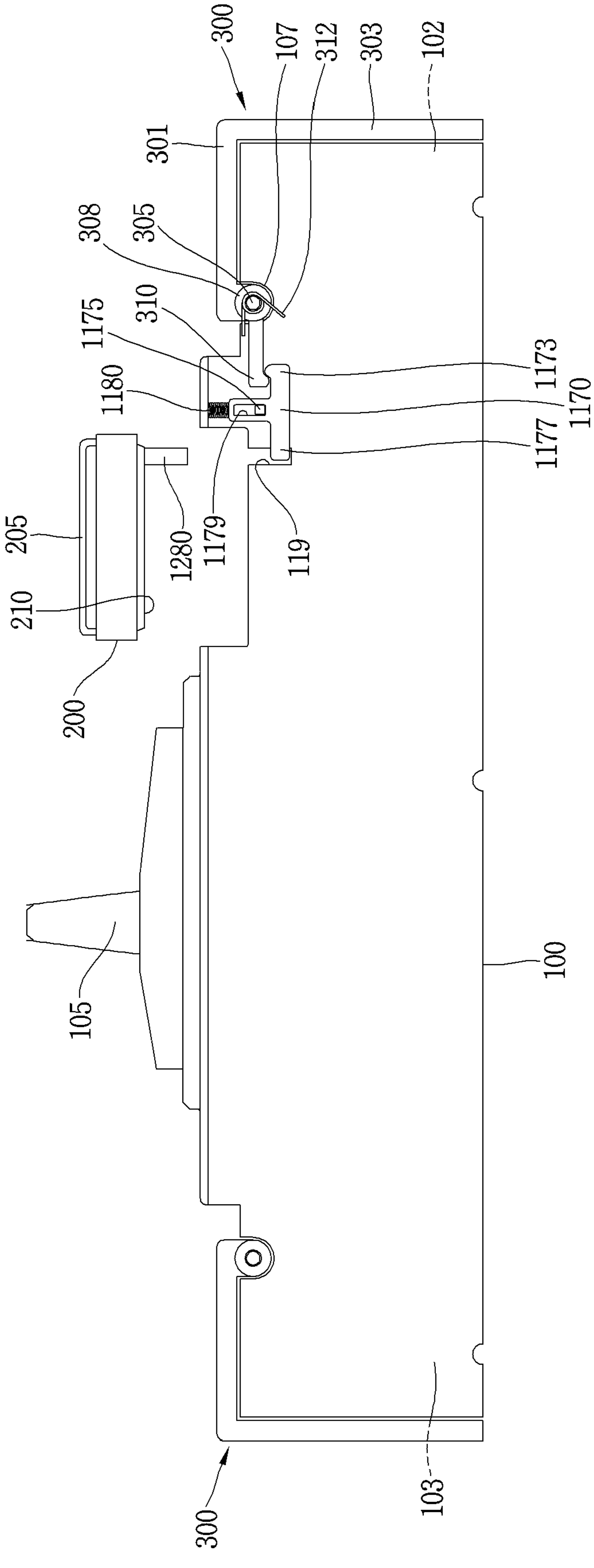
Figure 7:
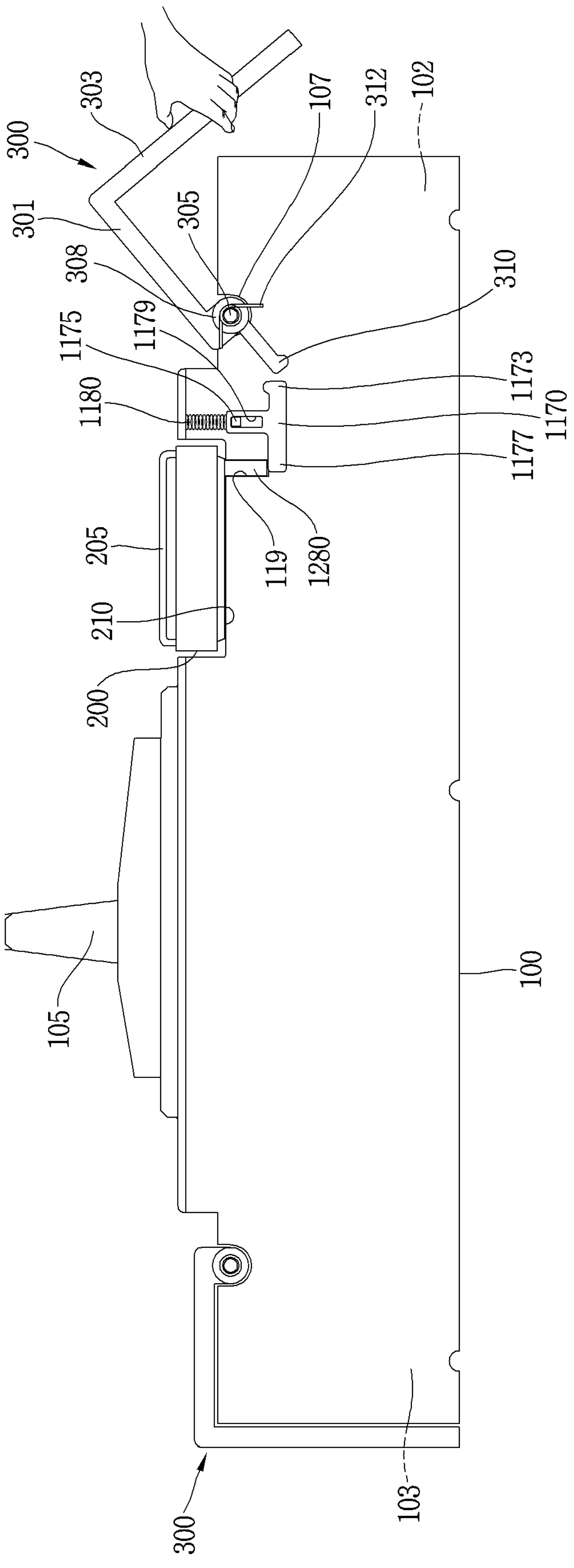

A semiconductor circuit breaker according to a second embodiment will be described. The semiconductor circuit breaker of the second embodiment follows the semiconductor circuit breaker of the first embodiment except for a terminal cover interlock portion. Accordingly, the detailed description of the same portions as those of the first embodiment will be omitted and only portions different therefrom will be described. FIGS. 6 and 7 illustrate side views of a second embodiment.

A semiconductor circuit breaker according to a second embodiment of the present disclosure includes a circuit breaker body 100 connected to a main circuit; and an interface module 200 independent from the circuit breaker body 100, wherein the circuit breaker body 100 has a module receiving part 110 provided on an outer surface of the circuit breaker body 100, and the interface module 200 includes a terminal cover that is detachably coupled to the module receiving part 110, and rotatably coupled to terminal parts 102, 103 of the circuit breaker body 100; a locking lever 310 provided in the terminal cover 300; an interlock member 1170 provided in the circuit breaker body 100 to restrict or release the locking lever 310; and an interlock driver 1280 provided in the interface module 200 to operate the interlock member 1170.

The terminal cover 300 is provided in the terminal parts 102, 103 of the circuit breaker body 100, respectively. The terminal cover 300 may be rotatably coupled to the terminal parts 102, 103. That is, the terminal cover 300 is coupled to the circuit breaker body 100 by a cover shaft 305.

The terminal cover 300 maintains a closed state of the terminal parts 102, 103 as long as no external force is applied. Accordingly, an arbitrary access to the terminal parts 102, 103 is prevented.

The terminal cover 300 is formed of an insulating material. Accordingly, the terminal cover 300 prevents the insulation breakdown of the terminal parts 102, 103 from occurring due to an external electric shock or a ground fault in the closed state.

The terminal cover 300 may be defined in an "L" shape when viewed from the side. That is, the terminal cover 300 includes an upper surface portion 301 and a front surface portion 303. Here, the upper surface portion 301 is closed, and a terminal connection groove 304 for each phase may be disposed in the front surface portion 303 for each phase.

The rotary part 308 is provided behind the upper surface portion 301 of the terminal cover 300. The rotary part 308 is disposed to protrude in an arc shape behind the upper surface portion 301. The rotary part 308 is inserted and installed in the shaft groove part 107 of the circuit breaker body 100.

The rotary shaft 305 is inserted and installed in the rotary part 308. The rotary shaft 305 is inserted and installed in a shaft groove or shaft hole (not shown) of the circuit breaker body 100 to allow the terminal cover 300 to rotate.

The first return spring 312 may be provided on the rotary shaft 305. In this embodiment, a force is applied to the first return spring 312 in a direction in which the terminal cover 300 is closed. Accordingly, when no external force is applied, the terminal cover 300 is placed in a closed state. Even when the terminal cover 300 is opened by the user, the terminal cover 300 is closed by a restoring force of the first return spring 312 when the external force is removed. The first return spring 312 may be configured with a torsion spring or a coil spring.

The locking lever 310 is provided on the upper surface portion 301 of the terminal cover 300 or the rotary part 308. The locking lever 310 may be disposed to partially protrude from the upper surface portion 301 or the rotary part 308. A first engaging protrusion may be disposed at an end portion of the locking lever 310.

The interlock member 1170 is provided. The interlock member 1170 may be installed at an inside of the circuit breaker body 100. The interlock member 1170 may be defined in a "T" shape. The interlock member 1170 is installed to be vertically and linearly movable by a guide part 1175.

A guide hole 1179 is disposed in the interlock member 1170. The guide hole 1179 is defined in a slit shape having a predetermined length up and down to allow the guide part 1175 to be inserted thereinto for operation.

The guide part 1175 protrudes from a portion of an enclosure of the circuit breaker body 100 to guide a vertical movement of the interlock member 1170.

An engaging portion 1173 is provided at one end of the interlock member 1170. The rotation of the locking lever 310 is limited, and the opening of the terminal cover 300 is restricted by the engaging portion 1173.

A second engaging protrusion may be disposed adjacent to the first engaging protrusion of the locking lever 310 in the engaging portion 1173.

An interlock release portion 1177 is provided at the other end of the interlock member 1170. The interlock release portion 1177 may be configured as a protruding lever.

A second return spring 1180 may be provided on the interlock member 1170. The second return spring 1180 acts in a direction to pull the interlock member 2170 upward when no external force is applied. The second return spring 1180 may be configured with a coil spring.

The interface module 200 is provided with an interlock driver 1280 that moves the interlock member 1170. The interlock driver 1280 is provided on one side of the coupling part 210. The interlock driver 1280 is disposed to protrude from one side of the coupling part 210.

An insertion hole 119 into which the interlock driver 1280 of the interface module 200 can be inserted is disposed in the module receiving part 110 of the circuit breaker body 100. When the interface module 200 is coupled to the module receiving part 110, the interlock driver 1280 is inserted into the insertion hole 119 to operate the interlock member 1170.

FIG. 7 illustrates a state in which the interface module 200 is coupled.

When the interface module 200 is coupled, the interlock driver 1280 presses the interlock release portion 1177 of the interlock member 1170 to move the interlock member 2170 downward while overcoming the force of the second return spring 1180. When the interlock member 1170 moves downward, the engaging portion 1173 also moves downward, and thus restriction to the locking lever 310 of the terminal cover 300 is released. Accordingly, it becomes a state in which the terminal cover 300 can be opened by the user.

In summary, when the interface module 200 is coupled, the interlock driver 1280 moves the interlock member 1170 downward, and restriction to the terminal cover 300 is released to become a state in which the terminal cover 300 can be opened. The user may open the terminal cover 300 and perform an operation for the terminal parts 102, 103 as needed.

Third Embodiment

Figure 8:
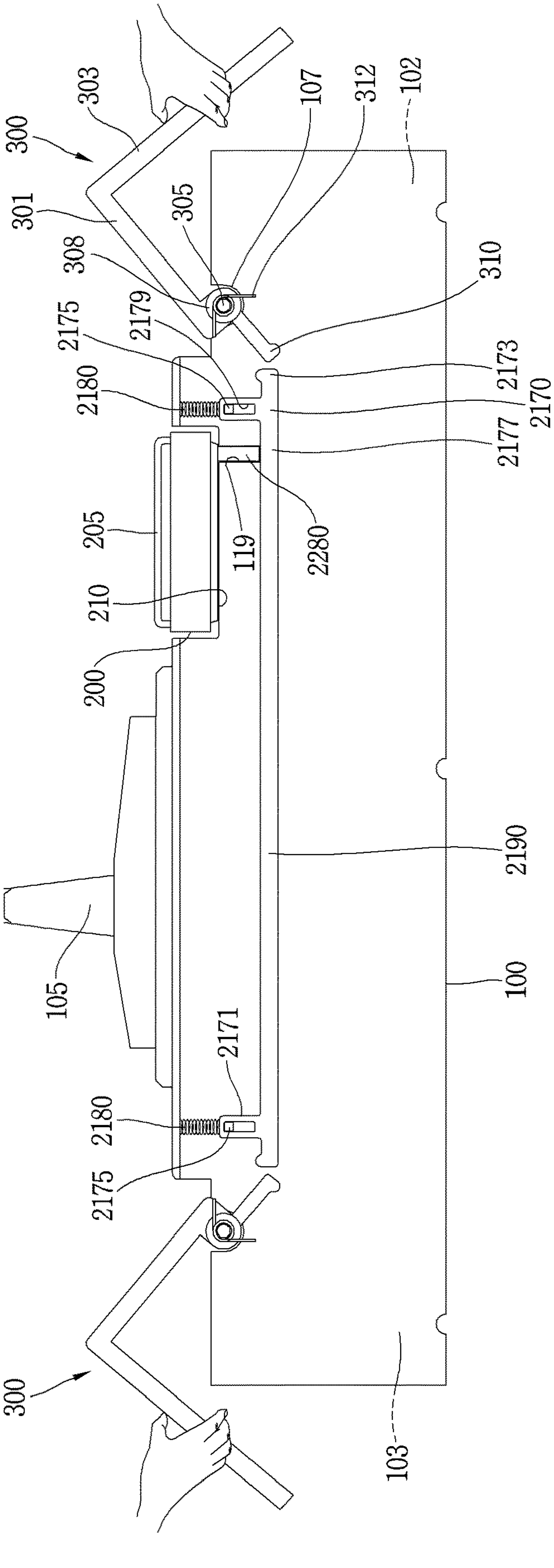
FIG. 8 is a side view of a semiconductor circuit breaker according to a third embodiment of the present disclosure, showing an interface module coupling state.

A semiconductor circuit breaker according to a third embodiment will be described. The semiconductor circuit breaker of the third embodiment follows the semiconductor circuit breaker of the second embodiment except for a terminal cover interlock portion. Accordingly, the detailed description of the same portions as those of the second embodiment will be omitted and only portions different therefrom will be described. FIG. 8 illustrates a side view of a third embodiment.

A semiconductor circuit breaker according to a third embodiment of the present disclosure includes a circuit breaker body 100 connected to a main circuit; and an interface module 200 independent from the circuit breaker body 100, wherein the circuit breaker body 100 has a module receiving part 110 provided on an outer surface of the circuit breaker body 100, and the interface module 200 includes a terminal cover that is detachably coupled to the module receiving part 110, and rotatably coupled to terminal parts 102, 103 of the circuit breaker body 100; a locking lever 310 provided in the terminal cover 300; an interlock member 2170 provided in the circuit breaker body 100 to restrict or release the locking lever 310; and an interlock driver 2280 provided in the interface module 200 to operate the interlock member 2170.

The terminal cover 300 is provided in the terminal parts 102, 103 of the circuit breaker body 100, respectively. The terminal cover 300 may be rotatably coupled to the terminal parts 102, 103. That is, the terminal cover 300 is coupled to the circuit breaker body 100 by a cover shaft 305.

The terminal cover 300 maintains a closed state of the terminal parts 102, 103 as long as no external force is applied. Accordingly, an arbitrary access to the terminal parts 102, 103 is prevented.

The terminal cover 300 is formed of an insulating material. Accordingly, the terminal cover 300 prevents the insulation breakdown of the terminal parts 102, 103 from occurring due to an external electric shock or a ground fault in the closed state.

The terminal cover 300 may be defined in an "L" shape when viewed from the side. That is, the terminal cover 300 includes an upper surface portion 301 and a front surface portion 303. Here, the upper surface portion 301 is closed, and a terminal connection groove 304 for each phase may be disposed in the front surface portion 303 for each phase.

The rotary part 308 is provided behind the upper surface portion 301 of the terminal cover 300. The rotary part 308 is disposed to protrude in an arc shape behind the upper surface portion 301. The rotary part 308 is inserted and installed in the shaft groove part 107 of the circuit breaker body 100.

The rotary shaft 305 is inserted and installed in the rotary part 308. The rotary shaft 305 is inserted and installed in a shaft groove or shaft hole (not shown) of the circuit breaker body 100 to allow the terminal cover 300 to rotate.

The first return spring 312 may be provided on the rotary shaft 305. In this embodiment, a force is applied to the first return spring 312 in a direction in which the terminal cover 300 is closed. Accordingly, when no external force is applied, the terminal cover 300 is placed in a closed state. Even when the terminal cover 300 is opened by the user, the terminal cover 300 is closed by a restoring force of the first return spring 312 when the external force is removed. The first return spring 312 may be configured with a torsion spring or a coil spring.

The locking lever 310 is provided on the upper surface portion 301 of the terminal cover 300 or the rotary part 308. The locking lever 310 may be disposed to partially protrude from the upper surface portion 301 or the rotary part 308. A first engaging protrusion may be disposed at an end portion of the locking lever 310.

An interlock member 2170 is provided. The interlock member 2170 may be installed at an inside of the circuit breaker body 100. The interlock member 2170 may be formed in a "π" shape. The interlock member 2170 is installed to be vertically and linearly movable by a guide part 2175.

The interlock member 2170 is configured with a length reaching the terminal cover 300 of the terminal parts 102, 103 on both sides. The support portions 2171 of the interlock member 2170 are disposed at both ends thereof, respectively.

Guide holes 2179 are disposed in the support portions 2171 on both sides of the interlock member 2170, respectively. The guide hole 2179 is defined in a slit shape having a predetermined length up and down to allow the guide part 1175 to be inserted thereinto for operation.

The guide part 2175 protrudes from a portion of an enclosure of the circuit breaker body 100 to guide a vertical movement of the interlock member 2170.

Engaging portions 2173 are provided at both ends of the interlock member 2170, respectively. The rotation of the locking lever 310 is limited, and the opening of the terminal cover 300 is restricted by the engaging portion 2173.

A second engaging protrusion may be disposed adjacent to the first engaging protrusion of the locking lever 310 in the engaging portion 2173.

An interlock release portion 2177 is provided at an intermediate portion of the interlock member 2170. The interlock release portion 2177 may be a portion of the body of the interlock member 2170.

A second return spring 2180 may be provided on the interlock member 2170. The second return spring 2180 may be provided on the support portions 2171, respectively. The second return spring 2180 acts in a direction to pull the interlock member 2170 upward when no external force is applied. The second return spring 2180 may be configured with a coil spring.

The interface module 200 is provided with an interlock driver 1280 that moves the interlock member 2170. The interlock driver 2280 is provided on one side of the coupling part 210. The interlock driver 2280 is disposed to protrude from one side of the coupling part 210.

An insertion hole 119 into which the interlock driver 2280 of the interface module 200 can be inserted is disposed in the module receiving part 110 of the circuit breaker body 100. When the interface module 200 is coupled to the module receiving part 110, the interlock driver 2280 is inserted into the insertion hole 119 to operate the interlock member 2170.

FIG. 8 illustrates a state in which the interface module 200 is coupled.

When the interface module 200 is coupled, the interlock driver 2280 presses the interlock release portion 2177 of the interlock member 2170 to move the interlock member 2170 downward while overcoming the force of the second return spring 2180. When the interlock member 2170 moves downward, restriction to the locking lever 310 of the terminal cover 300 is released. Accordingly, it becomes a state in which the terminal cover 300 can be opened by the user. At this time, the terminal covers 300 of both terminal parts 102, 103 are simultaneously released from restriction.

According to a semiconductor circuit breaker according to an embodiment of the present disclosure, an interlock is applied to a terminal cover provided in a terminal part of a circuit breaker body, thereby preventing an arbitrary access to the terminal part.

Accordingly, an arbitrary change of the terminal part is restricted, and a risk of insulation breakdown of the terminal part is reduced.

The opening of the terminal cover is allowed only when an interface module is coupled to the circuit breaker body.

Accordingly, the control of the circuit breaker body by the interface module is strengthened.

The embodiments described above are embodiments implementing the present disclosure, and it will be apparent to those skilled in this art that various changes and modifications may be made thereto without departing from the gist of the present disclosure. Accordingly, it should be noted that the embodiments disclosed in the present disclosure are only illustrative and not limitative to the concept of the present disclosure, and the scope of the concept of the disclosure is not limited by those embodiments. In other words, the scope protected by the present disclosure should be construed by the accompanying claims, and all the technical concept within the equivalent scope of the disclosure should be construed to be included in the scope of the right of the present disclosure.

The invention claimed is:

1. A semiconductor circuit breaker comprising:

a circuit breaker body connected to a main circuit, and provided with a module receiving part on an outer surface thereof; and an interface module provided independently from the circuit breaker body, and detachably coupled to the module receiving part, wherein the circuit breaker body comprises:

a terminal cover coupled to a terminal part of the circuit breaker body; and an interlock member provided in the circuit breaker body to restrict or release the opening of the terminal cover, and wherein the interface module comprises:

an interlock driver that operates the interlock member.

2. The semiconductor circuit breaker of claim 1, wherein the terminal cover is provided with a rotary part so as to be rotatably coupled to the terminal part.

3. The semiconductor circuit breaker of claim 1, wherein a locking lever restricted to the interlock member is disposed to protrude from the rotary part of the terminal cover.

4. The semiconductor circuit breaker of claim 1, wherein a first return spring is provided in the rotary part of the terminal cover to apply a force in a direction in which the terminal cover is closed.

5. The semiconductor circuit breaker of claim 3, wherein the interlock member is rotatably coupled to an inside of the circuit breaker body, and wherein a second return spring is provided in the interlock member to apply a force to the interlock member in a direction of restricting the locking lever.

6. The semiconductor circuit breaker of claim 5, wherein an engaging portion that restricts the locking lever is disposed to protrude from one end of the interlock member.

7. The semiconductor circuit breaker of claim 1, wherein the interlock driver comprises a magnet.

8. The semiconductor circuit breaker of claim 7, wherein the interlock member comprises an interlock release portion configured with a magnetic body to be attracted to the interlock driver.

9. The semiconductor circuit breaker of claim 6, wherein a guide hole is defined in a vertical slit shape in the interlock member, and a guide part inserted into the guide hole is disposed to protrude from the circuit breaker body so as to guide a vertical movement of the interlock member.

10. The semiconductor circuit breaker of claim 9, wherein an interlock driver that presses the interlock member downward is disposed to protrude from the interface module.

11. The semiconductor circuit breaker of claim 10, wherein an insertion hole into which the interlock driver is inserted is disposed in the module receiving part.

12. The semiconductor circuit breaker of claim 9, wherein the interlock member is configured with a length reaching the two terminal covers provided in both terminal parts of the circuit breaker body, respectively.

13. The semiconductor circuit breaker of claim 12, wherein the engaging portions are disposed at both end portions of the interlock member, respectively.

14. The semiconductor circuit breaker of claim 12, wherein the guide holes are respectively disposed in support portions protruding from both end portions of the interlock member, respectively.

* * * * *